(12) United States Patent
Lovis et al.

(10) Patent No.: US 12,194,659 B2
(45) Date of Patent: Jan. 14, 2025

(54) METHOD AND APPARATUS FOR RECYLCING LAMINATED GLASS

(71) Applicant: SAPERATEC GMBH, Dessau-Roßlau (DE)

(72) Inventors: Florian Lovis, Bielefeld (DE); Horst Seibt, Bielefeld (DE); Sebastian Kernbaum, Bielefeld (DE)

(73) Assignee: saperatec GmbH, Dessau-Roßlau (DE)

( * ) Notice: Subject to any disclaimer, the term of this patent is extended or adjusted under 35 U.S.C. 154(b) by 315 days.

(21) Appl. No.: 17/722,309

(22) Filed: Apr. 16, 2022

(65) Prior Publication Data

US 2022/0234255 A1 Jul. 28, 2022

Related U.S. Application Data

(63) Continuation-in-part of application No. 15/309,198, filed as application No. PCT/EP2015/059599 on Apr. 30, 2015, now abandoned.

(30) Foreign Application Priority Data

May 5, 2014 (GB) ...................... 1407892

(51) Int. Cl.
*B29B 17/04* (2006.01)
*B02C 23/10* (2006.01)
(Continued)

(52) U.S. Cl.
CPC .......... *B29B 17/0412* (2013.01); *B02C 23/10* (2013.01); *B29B 17/02* (2013.01);
(Continued)

(58) Field of Classification Search
CPC ................ B29B 17/02; B29B 17/0412; B29B 2017/0224; B29B 2017/0289; B02C 23/10
See application file for complete search history.

(56) References Cited

U.S. PATENT DOCUMENTS 6,502,424 B1  1/2003  Debailleul
8,520,531 B2  8/2013  Hasunuma et al.
(Continued)

FOREIGN PATENT DOCUMENTS

CN  101719529 A  6/2010
DE  42 13 450 C1  1/1994
(Continued)

OTHER PUBLICATIONS

Zhuang, D., Qiu, S., Zheng, H., Ziao, J., "Method for recovering crystalline silicon cell discs from double-glazed solar module having PVB interlayer," Chemical Abstractgs Service, Columbus, OH, Jul. 15, 2010.
(Continued)

*Primary Examiner* — Michael McCullough
*Assistant Examiner* — Kalyanavenkateshware Kumar
(74) *Attorney, Agent, or Firm* — 24IP Law Group USA, PLLC; Timothy R. DeWitt

(57) ABSTRACT

A method for recycling of laminated glass is disclosed. The laminated glass comprises at least one glass layer and at least one polyvinyl butyral (PVB). The method comprises mechanical removal of at least part of the glass, placing residual waste with glass particles in a vat comprising a separation fluid to produce a mixture of glass particles and one polyvinyl butyral (PVB) pieces from the residual waste, from which the one polyvinyl butyral (PVB) pieces can be screened off, washed, and dried for reuse. The separation fluid comprises water and butyl diglycol.

12 Claims, 3 Drawing Sheets

(51) Int. Cl.
*B29B 17/02* (2006.01)
*C03B 33/07* (2006.01)
*C08J 11/06* (2006.01)

(52) U.S. Cl.
CPC ............. *C03B 33/078* (2013.01); *C08J 11/06* (2013.01); *B29B 2017/0224* (2013.01); *C08J 2367/02* (2013.01)

(56) References Cited

U.S. PATENT DOCUMENTS

| | | |
|---|---|---|
| 8,530,531 B2 | 9/2013 | Fernandez et al. |
| 2009/0209667 A1 | 8/2009 | Thompson |
| 2010/0247902 A1 | 9/2010 | Fukatani et al. |
| 2012/0118886 A1* | 5/2012 | Sekiguchi .............. B32B 27/20 428/323 |

FOREIGN PATENT DOCUMENTS

| | | | |
|---|---|---|---|
| DE | 19608045 A1 * | 9/1997 | ............ B29B 17/02 |
| DE | 198 111 99 A1 | 9/1999 | |
| DE | 103 01 738 A1 | 7/2004 | |
| EP | 0953418 A2 | 11/1999 | |
| EP | 2 380 736 A1 | 10/2011 | |
| JP | 2003285042 A | 10/2003 | |
| JP | 2007084648 A | 4/2007 | |
| JP | 2008093513 A | 4/2008 | |
| WO | 99/02460 A1 | 1/1999 | |
| WO | 2007088984 A1 | 8/2007 | |
| WO | 2012/101189 A1 | 8/2012 | |

OTHER PUBLICATIONS

M. Tupy, P. Mokrejs, D. Merinska, P. Svoboda and J_ Zvonicek, "Windshield Recylcing Focused on Effective Separation of PVB Sheet," J_ Appl. Polym. Sci. 2014, 39879.

* cited by examiner

METHOD AND APPARATUS FOR RECYLCING LAMINATED GLASS

CROSS-REFERENCE TO RELATED APPLICATIONS

This application is a Continuation-in-Part of U.S. patent application Ser. No. 15/309,198, filed on Nov. 6, 2016 "Method and Apparatus for Recycling Laminated Glass," which is a US national stage application of International Patent Application No PCT/EP2015/059599 entitle "Method and Apparatus for recycling laminated glass" filed on Apr. 30, 2015, and claiming priority to and benefit of UK Patent Application No. 1407892.7 filed on May 5, 2014. The above-referenced applications are hereby incorporated herein by reference in their entirety.

BACKGROUND OF THE INVENTION

Field of the Invention

The invention comprises a method and apparatus for recycling laminated glass comprising a laminate of at least one glass layer and at least one polymer layer.

Brief Description of the Related Art

Laminated glass is a type of safety glass that holds together when the glass is shattered. In the event of breakage, the glass is typically held in place by a further polymer layer, which may be made of a polymer layer comprising polyvinyl butyral (PVB). Typically, the polymer layer is one or more interlayers sandwiched between two or more glass layers. The interlayer(s) keeps the glass layers bonded to the interlayer, even when one or both of the two glass layers are broken. The high strength of the interlayer prevents the glass layer(s) from breaking up into large sharp pieces.

Laminated glass is typically used in car windscreens but finds other applications such as in skylights in buildings or in hurricane regions, in which the glass needs to be prevented from shattering when exposed to high winds. The polymer layer also gives the glass a higher sound insulation rating, which means that the laminated glass can also be used near freeways or railway lines to improve the sound insulation of interior rooms.

Bullet-resistant glass is also known which is made of an interlayer of polycarbonate thermoplastic sandwiched between two glass layers. Similarly, aircraft windshields use three layers of glass with thick PVB layers sandwiched between the glass layers.

The laminated glasses have many applications, as discussed above. However, disposal of the laminated glass is problematic. The laminated glass used in car windscreens may no longer be disposed in landfill sites in the European Union. One method of recycling is to place the laminated glass into a rolling mill to fragment the laminated glass. The application of heat then melts the laminating plastic in the interlayer, thus allowing both the glass and the laminating plastic layer to be recycled. This requires the application of energy, which is inefficient.

The use of microemulsions for the separation of laminates is known, for example, from the Applicant's co-pending patent application No. WO 2012/101189, which teaches the separation of layers in laminates from each other. The teachings of that disclosure are directed towards the separation of laminates used in photovoltaic modules and there is no mention of their application to laminated glass.

A number of patent applications are known that deal with the recycling of laminated glass. For example, German patent application No. DE 198 111 99 teaches the dissolution of the entire polymer layer.

German patent No DE 42 13 450 also describes the separation of the polymer layer from glass using a chemical method. The chemicals used include acetic acid and sodium hydroxide solution.

U.S. Pat. No. 8,530,531 also teaches the use of acetic acid for separating the glass layers.

International patent application No. WO 99/02460 uses two filtration steps to separate the materials in a recycling plant. One issue known from the teachings of the international patent application is that the material being recycled tends to clog up the piping in the recycling plant.

European patent application No. EP 2 380 736 teaches a method and apparatus for separating a laminate comprising at least two glass sheets bonded together by at least one polymeric interlayer film made of PVB. The method comprises adhering the laminate using one of the glass sheets to one or more suction cups and attaching at least one other glass sheet to a fixation means. The laminate is heated above the softening point of the polymeric interlayer film and the suction cups are moved relative to the fixation means, thereby sheering off the interlayer film and separating the glass sheets.

A subsequent step is used to remove any remaining traces of the interlayer polymer film from the glass sheets. This is done at an elevated temperature (50° C. to 150° C.) and pressure (up to 15 bar), optionally using an organic solvent, such as ethanol or isopropanol. The elevated temperature and pressure require a large amount of energy and furthermore the use of these flammable alcohols means that there is a risk of an explosion.

German patent application DE 103 01 738 teaches a method for recycling laminated glass comprising at least one polyvinyl butyral layer and at least one glass layer. The method comprises the step of shredding the laminated glass to produce glass and residual waste and further adding the residual waste in a bath to produce a mixture of glass particles from the glass layers and the polyvinyl butyral pieces. The application describes a water-filled bath comprising 0.001 to 0.01% by weight of a metal alcoholate catalyst. The water-filled bath enables a separation between the glass layer and the polyvinyl butyral layer by a structural change in the interface between the glass layer and the polyvinyl butyral layer.

US Patent Application No 2010/0247902 teaches an interlayer film for a laminated glass, not allowing visual identification of persons or objects behind the glass while transmitting a certain amount of visible light and having an excellent heat insulating property. A method for producing the interlayer film for a laminated glass is disclosed and comprises a step of mixing a plasticizer, a dispersant and titanium oxide particles. The plasticizer is an acid ester obtained by a reaction between a glycol and a monobasic organic acid. The acid ester obtained has neither an alcohol function nor an acid function. Adding the acid ester to the mixture of the dispersant and the titanium oxide particles causes a change in the intermolecular properties between bonds of the interlayer film in the laminated glass. This results in the interlayer film having a reduced melt viscosity and a lower temperature of a second-order transition of the interlayer film, as well as reducing the elastic module of the interlayer film. The effect of the plasticizer in this patent document is to enable a creation of a more flexible and workable interlayer film.

CN Patent No 101719529 teaches a method for recovering a crystalline silicon cell plate in a double-glass solar cell assembly with a polyvinyl butyral resin interbed under the condition of no damage to a crystalline silicon cell. The method for recovering a crystalline silicon cell plate comprises heating and thermal insulating the double-glass solar cell assembly. After the polyvinyl butyral resin is molten, the double-glass solar cell assembly is placed into a solvent for soaking and enabling the crystalline silicon cell plate to separate from the polyvinyl butyral resin. The solvent disclosed is selected from C1-C4 alcohols, C3-C6 ketone, di ether, tetrahydrofuran and cyclohexanol. The solvent may contain a small amount of water, but the water content in the solvent is 15% (by volume) or less.

SUMMARY OF THE INVENTION

A method for recycling laminated glass is disclosed. The laminated glass comprises at least one polyvinyl butyral (PVB) layer and at least one glass layer. The method comprises shredding the laminated glass to produce glass and residual waste (comprising polyvinyl butyral (PVB) pieces with embedded glass particles), placing the residual waste in a vat comprising the separation fluid to produce a mixture of glass particles from the glass layers and polyvinyl butyral (PVB) pieces from the at least polyvinyl butyral (PVB) layer and the separation fluid. The method of this disclosure is performed at normal atmospheric pressure and only mildly elevated temperatures (30-50° C.), which reduces the amount of energy required for performing the recycling as well as substantially simplifying the apparatus used. The separation fluid comprises water and butyl diglycol.

The butyl diglycol in the separation fluid enables the separation of the at least one polymer layer from the at least one glass layer in the laminated glass by partial swelling of the polymer and thus, reducing the intermolecular forces between the glass layer and the at least one polymer layer.

In one aspect, a concentration of the butyl diglycol in the separation fluid is between 10 and 25%. This concentration of butyl diglycol has been found to enable swelling of the polyvinyl butyral (PVB) layer to remove more easily the embedded glass particles from the polyvinyl butyral pieces.

The method further comprises sieving, washing, and drying the polyvinyl butyral (PVB) pieces from the mixture. The separating fluid and any remaining washing water can be re-cycled, which reduces disposal costs and environmental damage.

An apparatus for the recycling of the laminates is also disclosed. The apparatus comprises a vat having the separation fluid, a device for adding portions of the laminates into the vat and a sieving device for sieving polyvinyl butyral (PVB) pieces from the separation fluid comprising the separated glass particles.

The apparatus may also comprise a shredding device for shredding the laminated glass and removal of a substantial proportion of the glass particles, prior to transportation of the objects comprising the polyvinyl butyral (PVB) pieces with remaining ones of the glass particles to the vat.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

DESCRIPTION OF THE FIGURES

For a more complete understanding of the present invention and the advantages thereof, reference is now made to the following description and the accompanying drawings, in which.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with the feature of a different aspect or aspects and/or embodiments of the invention.

Figure 1:
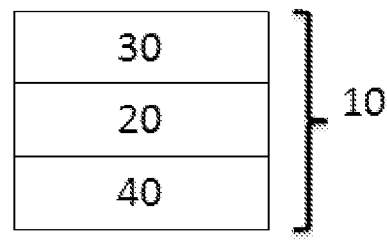
FIG. 1 shows one illustrative example of a laminated glass, which is recycled using the method of this disclosure.

FIG. 1 shows a non-limiting example of a laminate 10 used in a car window glass. The laminate 10 comprises a polymer layer 20, which is laminated as an interlayer between a first glass layer 30 and a second glass layer 40.

The laminate 10 is used, in one aspect of the invention, in a car windscreen (also called windshield). It was noted in the introduction that the laminates also find application in a number of other fields and the teachings of this disclosure are not limited to laminated glass for car windscreens. In a further aspect of the invention, the laminate 10 comprises three glass layers between which two polymer layers are interlaid.

In one non-limiting example of the invention, the polymer layer 20 is made of polyvinyl butyral (PVB), which is typically used in car windscreens. Other thermoplastics can be used as the polymer layer.

Figure 3:
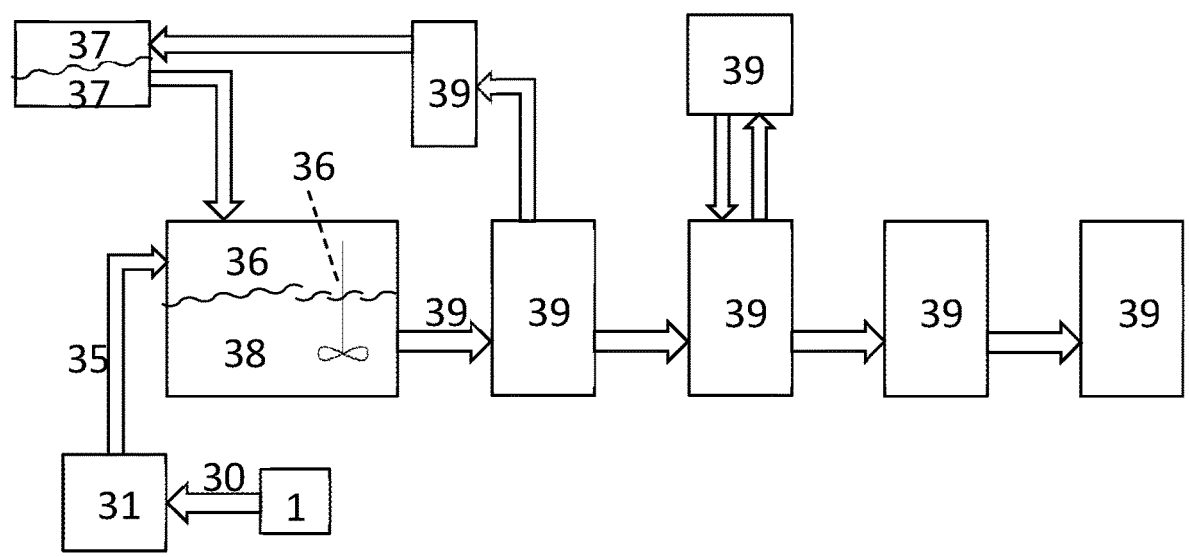
FIG. 3 shows an overview of the apparatus for recycling using the teachings of this disclosure.

FIG. 3 shows an example of a recycling plant for the recycling of the laminates 10. It will be appreciated that the plant shown in FIG. 3 is merely exemplary and is not limiting of the invention. The plant includes a shredder 310 and a vat 360. The shredder 310 crushes and shreds the glass laminate 10 mechanically. The vat 360 has a fluid dispenser 370 for dispensing separating fluid 375 into the vat 360 and a mixing device 365. The vat 360 has an outlet 390 for removing materials 380 from the vat 360. It will be noted that the shredder 310 and the vat 360 do not need to be co-located. In one aspect of the invention, at least some of the elements of the plant will have anti-adhesive PTFE coatings, which reduces the risk of clogging of the pipework in the plant. The outlet 390 leads to a sieving device 393 to sieve out the polymer pieces, a washing device 395 and a drying device 396. Device 399 represents schematically a device to package and reuse the polymer pieces, which could be an extruder or a melting device.

Washing water from the washing device 395 can be treated in a treatment device 397 to enable reuse of the washing water. A filtering device 394 is connected to the sieving device 393 to clean used separating fluid 375 from glass particles and return the filtered separating fluid 375 back to the fluid dispenser 370 for re-use.

Figure 2:
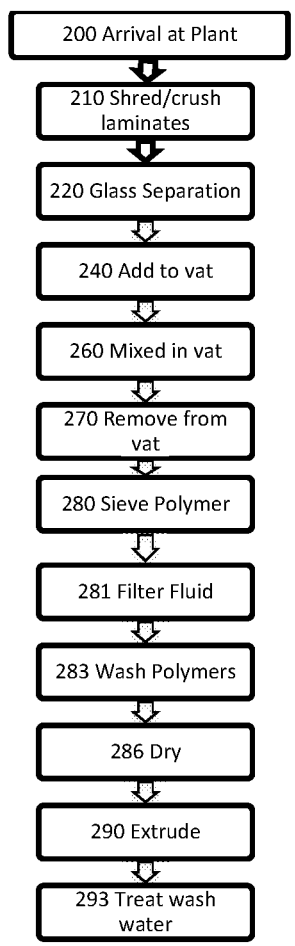
FIG. 2 shows a flow diagram of the method using the teachings of this disclosure.

FIG. 2 shows an outline of the method for recycling of the glass laminates 10 of this disclosure. The glass laminates 10 are collected together as portions 300 of the glass laminates 10. On arrival in step 200 at the recycling plant, the glass laminates 10 are placed into the shredder 310 and crushed or shredded in step 210 to produce glass from the glass layer 30 and 40, as well as pieces of the polymer layer 20 with residual particles of glass (350), partially impregnated therein as splinters.

The pieces of the polymer layer 20 are separated in step 220 from the glass of the glass layers 30, 40. The glass is recycled, as is known in the art. In step 240, the remaining laminate portions comprising the polymer pieces with the residual glass particles 350 are added to the vat 360 with a separation fluid 375 from the fluid dispenser 370. The mixture of the separation fluid 375 and the polymer pieces is then mixed in step 260 in the vat 360. The effect of the separation fluid 375 is thought to be to swell the surface of the polymer pieces and thus "expel" the glass particles from the surface of the polymer pieces. This is achieved at a given temperature, for example between 0° C. and 50° C., at atmospheric pressure during a treatment time of between 10 and 180 minutes.

The material 380 comprising the separating fluid 375 and the polymer pieces, as well as any residual glass pieces, can be removed in step 270 from the vat 360. The polymer pieces can be removed in step 280 by sieving in device 393. It will be noted that the separating fluid 375 and any residual glass pieces pass through the device 393. The separating fluid 375 is then filtered with device 394 for recycling in step 281 and placed back into the fluid dispenser 370. The filtering step 281 removes substantially all of the residual glass pieces and any other impurities from the separating fluid 375.

The polymer pieces are washed in washing water in step 283 in a washer 395 and dried in step 286 in the dryer 396. The polymer pieces can be extruded or packaged for reuse in step 290, e.g., for use in the manufacture of new windshields. The washing water needs to be treated in step 293 before the water is also reused. The treatment of the washing water is done by filtering out any glass and other impurity particles from the washing water and by removing any remaining separating fluid from the washing water in the treatment device 397. The filtering and the removal of the separating fluid is done, for example, by regular and/or cross flow filtration techniques and reverse osmosis, which allows reclaiming chemicals of the separation fluid from the washing water.

The separation fluid 375 used in the vat 360 and coming from the fluid dispenser 370 is a solution of a water-soluble alcohol in water. Non-limiting examples of such water-soluble alcohols include lower alcohols such as methanol, ethanol, n-propanol, isopropanol, n-butanol, sec.-butanol, tert.-butanol and 2-methylpropanol, pentanols, benzyl alcohol, glycol ethers such as methyl glycol, ethyl glycol, propyl glycol, isopropyl glycol, butyl glycol, butyl diglycol, butyl triglycol, methyl diglycol, methyl triglycol, ethyl diglycol, phenyl glycol, phenoxy propanol, methoxy propanol, methoxy butanol, ethoxy propanol, propylene glycol butyl ether, di(propylene glycol)butyl ether, tri(propylene glycol) methyl ether, tri(propylene glycol)butyl ether and others, such as diacetone alcohol or ethyl lactate.

The separation fluid 375 is kept between 0 and 50° C., and at pH values of around 7. The speed of the reaction depends to a large extent on the diffusion rate into the surface of the polymer layer, which itself is governed by the choice of the alcohol, the concentration of the alcohol, and the temperature.

Examples of the separating fluid and process conditions

The examples listed below are merely illustrative examples of a suitable separating fluid and the process conditions and are not limiting of the invention.

A 25% solution of butyl diglycol in water was used as the separating medium 375. The treatment time was 2 hours at 40° C. at normal atmospheric pressure.

A 25% solution of butyl diglycol in water was used as the separating medium 375. The treatment time was 3 hours at 30° C. at normal atmospheric pressure.

A 25% solution of butyl diglycol in water was used as the separating medium 375. The treatment time was 2 hours at 35° C. at normal atmospheric pressure.

A 20% solution of butyl diglycol in water was used as the separating medium 375. The treatment time was 2 hours at 40° C. at normal atmospheric pressure.

A 10% solution of butyl glycol in water was used as the separating medium 375. The treatment time was 1.5 hours at 40° C. at normal atmospheric pressure.

What is claimed is:

1. A method for recycling laminated glass comprising at least one polyvinyl butyral layer and at least one glass layer, wherein the method comprises:
   shredding the laminated glass to produce glass and residual waste comprising polyvinyl butyral pieces with embedded glass particles;
   adding the residual waste in a vat comprising a separation fluid to produce a mixture of glass particles from the glass layers and the polyvinyl butyral pieces from the at least one polyvinyl butyral layer, the separation fluid comprising water and butyl diglycol.

2. The method of claim 1, further comprising sieving, washing in washing water, and drying the polyvinyl butyral pieces from the mixture.

3. The method of claim 2, further comprising treatment of the washing water to enable re-use of the washing water.

4. The method of claim 1, further comprising filtering of the separation fluid.

5. The method of claim 1 wherein the concentration of butyl diglycol in the separation fluid is between 10 and 25%.

6. An apparatus for the recycling of laminates comprising at least one polyvinyl butyral layer and at least one glass layer, the apparatus comprising:
   a vat having a separation fluid, wherein the separation fluid comprises water and butyl diglycol;
   a device for adding at least portions of the laminates into the vat; and
   a sieving device for sieving polyvinyl butyral pieces of the at least polyvinyl butyral layer from the separation fluid.

7. The apparatus of claim 6, further comprising a shredding device for shredding the laminated glass and removal of a proportion of the glass particles prior to adding the polyvinyl butyral pieces with remaining ones of the glass particles to the vat.

8. The apparatus of claim 6, further comprising an extruder for extruding the polyvinyl butyral pieces.

9. The apparatus of claim 6, further comprising at least one of a washer comprising a washing water and a dryer to treat the polyvinyl butyral pieces.

10. The apparatus of claim 9, further comprising a treatment device for treating the washing water.

11. The apparatus of claim 6, further comprising a filtering device to filter the separation fluid.

12. A combination of a separation fluid and a laminate comprising at least one polyvinyl butyral layer and at least one glass layer, the separation fluid comprising a mixture of water and butyl diglycol.

* * * * *